United States Patent
Wang et al.

(10) Patent No.: US 10,059,447 B2
(45) Date of Patent: *Aug. 28, 2018

(54) METHOD AN APPARATUS FOR CONTROLLING UNMANNED AERIAL VEHICLE

(71) Applicant: ZEROTECH (Chongqing) Intelligence Technology Co., Ltd., Chongqing (CN)

(72) Inventors: Shuaiqin Wang, Beijing (CN); Xiongwei Zhu, Beijing (CN); Yiqiang Zheng, Beijing (CN); Lin Yang, Beijing (CN); Jianjun Yang, Beijing (CN)

(73) Assignee: ZEROTECH (CHONGQING) INTELLIGENCE TECHNOLOGY CO., LTD., Longxing Town, Yubei District, Chongqing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/394,850

(22) Filed: Dec. 30, 2016

(65) Prior Publication Data

US 2017/0291705 A1 Oct. 12, 2017

Related U.S. Application Data

(63) Continuation-in-part of application No. 15/180,027, filed on Jun. 12, 2016, now Pat. No. 9,632,501.

(30) Foreign Application Priority Data

Apr. 11, 2016 (CN) .......................... 2016 1 0221731
Sep. 5, 2016 (CN) .......................... 2016 1 0802810

(51) Int. Cl.
*B64C 27/08* (2006.01)
*B64C 19/00* (2006.01)
(Continued)

(52) U.S. Cl.
CPC ............ *B64C 39/024* (2013.01); *B64C 27/08* (2013.01); *B64D 47/08* (2013.01); *G05D 1/0016* (2013.01);
(Continued)

(58) Field of Classification Search
CPC ....... G05D 1/0011; G05D 1/0858; B64F 1/04; B64C 39/024; B64C 27/08; B64C 19/00;
(Continued)

(56) References Cited

U.S. PATENT DOCUMENTS 5,156,232 A * 10/1992 Muroya ................. B60K 28/04
                                                            180/273
5,730,394 A * 3/1998 Cotton ................. G05D 1/0858
                                                            244/180

(Continued)

FOREIGN PATENT DOCUMENTS

CN      105388911 A     3/2016
EP       1407965 A1     4/2004

OTHER PUBLICATIONS

Drones Etc.: "DJI Phantom 3 First Flight and DJI Pilot App Overview HD", YouTube, May 27, 2015 (May 27, 2015), pp. 1-2, XP054977578.

(Continued)

*Primary Examiner* — Yuri Kan
(74) *Attorney, Agent, or Firm* — Jun He Law Offices P.C.; James J. Zhu

(57) ABSTRACT

A method and an apparatus for controlling an unmanned aerial vehicle (UAV) are provided. The UAV comprises at least one rotor. The method includes: receiving a take-off preparatory signal instructing the UAV to enter into a take-off preparatory state; controlling the at least one rotor of the UAV to rotate at a preset rotation speed in response to the take-off preparatory signal, wherein the preset rotation (Continued)

speed is smaller than a rotation speed that enables the UAV to hover in the air; and controlling the UAV to enter into a hovering mode under a predetermined condition, wherein the UAV is controlled to hover at a predetermined height in the hovering mode.

24 Claims, 8 Drawing Sheets

(51) Int. Cl.
    *B64D 31/06*     (2006.01)
    *B64C 39/02*     (2006.01)
    *B64D 47/08*     (2006.01)
    *G05D 1/00*     (2006.01)
    *G05D 13/00*     (2006.01)
    *G05D 1/06*     (2006.01)

(52) U.S. Cl.
    CPC ........... *G05D 1/0669* (2013.01); *G05D 13/00* (2013.01); *B64C 2201/027* (2013.01); *B64C 2201/108* (2013.01); *B64C 2201/127* (2013.01); *B64C 2201/141* (2013.01); *B64C 2201/146* (2013.01)

(58) Field of Classification Search
    CPC ...... B64B 1/06; A63H 27/12; G06Q 30/0601; B60K 28/04; B64D 31/06; H04N 5/23203
    USPC .................... 701/2, 4; 244/25, 63, 165, 180; 381/71.12
    See application file for complete search history.

(56) References Cited

U.S. PATENT DOCUMENTS

| | | | | |
|---|---|---|---|---|
| 6,142,414 | A * | 11/2000 | Doolittle | B64B 1/06 244/2 |
| 9,632,501 | B1 * | 4/2017 | Yang | B64C 19/00 |
| 2009/0076931 | A1 * | 3/2009 | Hung | G06Q 30/0601 705/26.1 |
| 2013/0206915 | A1 * | 8/2013 | Desaulniers | B64C 39/024 244/165 |
| 2013/0325217 | A1 * | 12/2013 | Seydoux | A63H 27/12 701/4 |
| 2015/0331426 | A1 * | 11/2015 | Shi | B64D 31/06 701/4 |
| 2016/0009412 | A1 * | 1/2016 | Manasseh | B64F 1/04 244/63 |
| 2016/0063987 | A1 * | 3/2016 | Xu | B64C 39/024 381/71.12 |
| 2017/0099424 | A1 * | 4/2017 | Jones | H04N 5/23203 |

OTHER PUBLICATIONS

Anonymous: "Phantom 3 Standard Guida di avvio rapido v1.0", dji.com, Nov. 26, 2015 (Nov. 26, 2015), XP002772271.
The extended European search report for EP17153176.7.

* cited by examiner

METHOD AN APPARATUS FOR CONTROLLING UNMANNED AERIAL VEHICLE

CROSS-REFERENCE TO RELATED APPLICATIONS

This application is a Continuation-In-Part of U.S. patent application Ser. No. 15/180,027 filed on Jun. 12, 2016, and claims priority to Chinese patent application No. 201610221731.8 field on Apr. 11, 2016, and Chinese patent application No. 201610802810.8 filed on Sep. 5, 2016, the entire contents of which are incorporated herein by reference.

TECHNICAL FIELD

The present disclosure generally relates to a method and an apparatus for controlling an unmanned aerial vehicle (UAV).

BACKGROUND

With the continuous development of aviation technology, aerial apparatuses have been widely used in military and civilian fields, and aerial apparatus refers to an aircraft or UAVs and other aerial devices with flight capabilities and so on. Aerial apparatus has been widely used in geological disaster monitoring, forest fire prevention, aerial mapping, environmental monitoring and detection of target and other fields.

A variety of techniques have been developed in connection with the operation of the UAVs, including take-off, in-air flight, and landing. For example, take-off is one of common used operations of the UAVs. In the art known to the present inventors, UAVs take-off techniques can be categorized into two approaches.

One approach is to launch the UAVs from the ground. For example, prior to take-off, a typical rotary wing UAV is placed on the ground by a skilled user. Then, the skilled user controls take-off of the rotary wing UAV by manipulating a remote control device associated with the rotary wing UAV. During take-off, in order to make the UAVs' take-off safe and smooth, the skilled user is required to control the UAVs' attitude balance and propulsion power output.

An alternative approach is to launch the UAVs via hand tossing. That is, UAVs are thrown into the air and then the UAVs in the air intelligently identify take-off opportunity and start flying in the air into the normal state. Compared with the first approach, hand launching lowers the requirement of the user's operating skills and capability.

SUMMARY

An example method for controlling an unmanned aerial vehicle (UAV) is provided. The UAV includes at least one rotor, and the method includes: receiving a take-off preparatory signal instructing the UAV to enter into a take-off preparatory state; controlling the at least one rotor of the UAV to rotate at a preset rotation speed in response to the take-off preparatory signal, wherein the preset rotation speed is smaller than a rotation speed that enables the UAV to hover in the air; and controlling the UAV to enter into a hovering mode under a predetermined condition, wherein the UAV is controlled to hover at a predetermined height in the hovering mode.

An example apparatus for controlling an UAV is provided. The UAV includes at least one rotor, and the apparatus includes a receiver configured to receive a take-off preparatory signal instructing the UAV to enter into a take-off preparatory state; and a controller configured to: control the at least one rotor of the UAV to rotate at a preset rotation speed in response to the take-off preparatory signal, wherein the preset rotation speed is smaller than a rotation speed that enables the UAV to hover in the air; and control the UAV to enter into a hovering mode under a predetermined condition, wherein the UAV is controlled to hover at a predetermined height in the hovering mode.

It is to be understood that both the foregoing general description and the following detailed description are exemplary and explanatory only, and are not restrictive of the invention. Further, the accompanying drawings, which are incorporated in and constitute a part of this specification, illustrate embodiments of the invention and together with the description, serve to explain principles of the invention.

BRIEF DESCRIPTION OF THE DRAWINGS

The drawings referenced herein form a part of the specification. Features shown in the drawing illustrate only some embodiments of the disclosure, and not of all embodiments of the disclosure, unless the detailed description explicitly indicates otherwise, and readers of the specification should not make implications to the contrary.

The same reference numbers will be used throughout the drawings to refer to the same or like parts.

DETAILED DESCRIPTION OF THE PREFERRED EMBODIMENTS

The following detailed description of exemplary embodiments of the disclosure refers to the accompanying drawings that form a part of the description. The drawings illustrate specific exemplary embodiments in which the disclosure may be practiced. The detailed description, including the drawings, describes these embodiments in sufficient detail to enable those skilled in the art to practice the disclosure. Those skilled in the art may further utilize other embodiments of the disclosure, and make logical, mechanical, and other changes without departing from the spirit or scope of the disclosure. Readers of the following detailed description should, therefore, not interpret the description in a limiting sense, and only the appended claims define the scope of the embodiment of the disclosure.

In this application, the use of the singular includes the plural unless specifically stated otherwise. In this application, the use of "or" means "and/or" unless stated otherwise. Furthermore, the use of the term "including" as well as other forms such as "includes" and "included" is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the subject matter described.

Figure 1A:
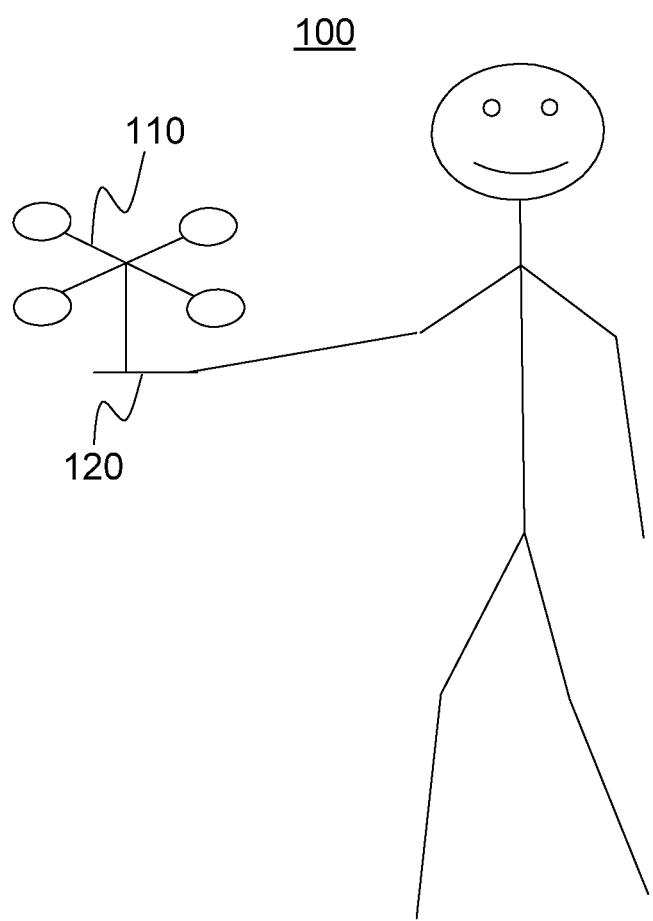
FIGS. 1A-1C are diagrams of an exemplary UAV take-off system environment within which embodiments of the disclosure may be practiced.
Figure 1B:
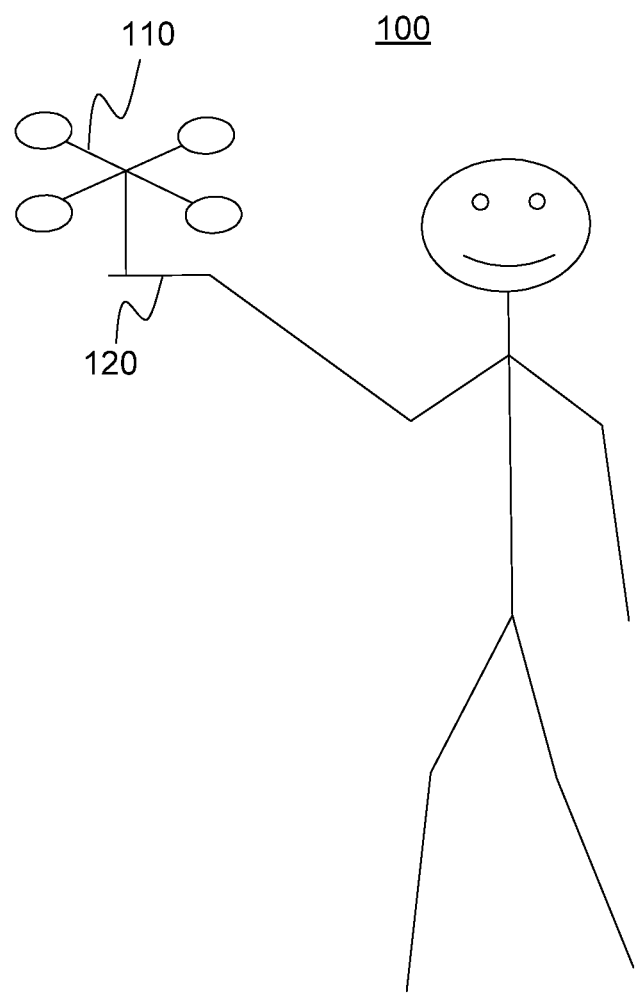
Figure 1C:
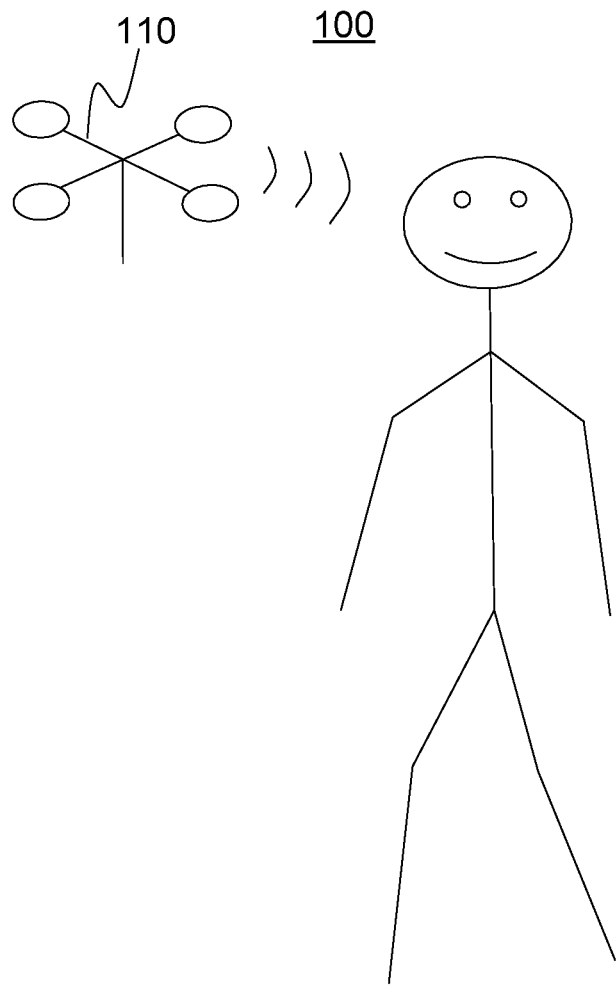

FIGS. 1A-1C illustrate an exemplary UAV take-off system environment 100 within which embodiments of the present disclosure may be practiced.

In FIG. 1A, an UAV 110 and a take-off platform 120 are provided in the UAV take-off system environment 100. The UAV 110 represents an aircraft without a human pilot aboard. The flight of UAV 110 may be controlled with various kinds of autonomy. It may be operated either by a given degree of remote control from a user located on the ground or in another vehicle, or fully autonomously, by onboard computers. Further, in order to fully operate and extend its capability, the UAV 110 may be programmed with various computer software and carry payloads such as cameras, power supply, sensors, actuators. For example, the UAV 110 can be configured with an image capturing device, such as a camera, to capture an image during a flight in civilian or military use. In the example of capturing the image in civilian use, the UAV 110 can be configured to flight in a particular height to capture an image of the user.

Further, UAVs can be categorized into a rotary-wing UAV and a fixed-wing UAV. Typically, the rotary-wing UAV does not require runways to take off or land and possesses the capacity to hover over areas while performing agile maneuvering. In the example of FIG. 1A, the UAV 110 is equipped with a plurality of rotors, for example, four rotors. However, persons of ordinary skill in the art will recognize that the UAV 110 may carry on any number of rotors as required without departing from the spirit or scope of the present disclosure. That is, the UAV 110 drives its body through adjusting the propulsion output of the rotors, thereby moving the UAV 110 as required in a desired direction and at a desired speed.

The take-off platform 120 refers to a tool that supports the UAV 110 before take-off. As depicted in FIG. 1A, the take-off platform 120 refers to the user's hand. More specifically, the UAV 110 may be put on a palm of the user's hand and prepared to launch from the palm. However, the UAV 110 may be assisted and supported by other tools, such as a mobile platform with a certain height.

As shown in FIG. 1A, the UAV 110 is placed by a user on the take-off platform 120 and prepared to launch from the user's hand 120 according to the user's instructions. In FIG. 1A, the UAV 110 is placed at a position, for example, a position with a relative low height (below the user's head). However, persons of ordinary skill in the art will recognize that the UAV 110 may be placed at other positions without departing from the spirit or scope of the present disclosure.

The user could input an instruction to the UAV 110 at the position shown in FIG. 1A. Once the instruction is input by the user, the UAV 110 could control its propulsion units to start outputting a relative low power. For example, the UAV 110 could control a rotation speed of at least one rotor with a preset rotation speed in response to the instruction. The preset rotation speed may be an idle rotation speed.

Additionally, once the instruction is input by the user, a first timer could be set up to start counting a preset preparatory time to remind the user that the UAV 110 is about to control its propulsion units to output power.

Further, based on predetermined conditions, the UAV 110 will adjust the output of power to achieve intended operations, for example, hover at a preset position. Specifically, the UAV 110 will increase the rotation speed of the at least one rotor to, for example, a rated speed rotation once the predetermined conditions are met. Then, the rotation speed of at least one rotor is adjusted to reach a speed that enables the UAV 110 to make stable hovering. In an example of lifting up the UAV 110 with the user's hand, once the rotation speed of the rotors is increased up to the speed that enables the UAV 110 to make stable hovering, the UAV 110 could hover in a position as desired. Alternatively, when performing the UAV 110 take-off through other auxiliary devices, once the rotation speed of the rotors reaches the speed that enables the UAV 110 to make stable hovering, the auxiliary device is removed, and the UAV 110 achieves a steady hover.

An example of the predetermined conditions is that a detected motion speed of the UAV 110 is greater than or equal to a threshold. Another example of the predetermined conditions is a second preset delay time has expired since controlling a rotation speed of the at least one rotor with the preset rotation speed in response to the take-off preparatory signal. A second timer could be set up to start counting the second preset delay time to remind the user that the rotation speed of the at least one rotor will be increased. In the example of FIG. 1A, the user could withdraw his hand from holding/supporting the UAV 110, or move the UAV 110 upward or downward with his hand to trigger the predetermined conditions.

As illustrated above, once the user inputs the instruction to the UAV 110, the first timer is set up to start counting a preset preparatory time to remind the user that the UAV 110 is about to control its propulsion units to output power. During the preset preparatory time, the user could perform additional actions.

In the example of FIG. 1B, the UAV 110 is placed at a position with a higher height as compared to the position of FIG. 1A, for example, substantially same as or a bit higher than the user's head. The specific height is not set as a limitation. For example, the user could move up his hand 120 holding the UAV 110 to an intended position for his personal use, e.g., photo/video capturing. Accordingly, the UAV 110 is lifted by the user up to the intended position higher than the position as shown in FIG. 1A. Once the preset preparatory time lapsed, the UAV 110 controls its propulsion units to start outputting power.

Then the user could perform actions to trigger the predetermined conditions under which the UAV 110 could adjust its output power to achieve intended operations. For example, the user can withdraw his hand 120 from holding the UAV 110 at a particular moment.

In the example of FIG. 1C, once the predetermined condition is met, the rotation speed of the at least one rotor is increased from the preset rotation speed to the rated rotation speed. Since the rated rotation speed may not enable the UAV 110 to make stable hovering, the rotation speed of the at least one rotor may be adjusted to change the motion speed of the UAV 110, such that the UAV 110 can be controlled to hover at a predetermined height. The predetermined height may be substantially same as the height of the position in FIG. 1B.

Additionally, the predetermined height may be affected by a motion speed with which the user moves the UAV 110 upward or downward to trigger the predetermined condition.

In the process to control the UAV 110 to hover at the predetermined height, the motion speed of the UAV 110 is compared with a first threshold motion speed, and a third timer could be set up to count a first preset delay time. If the comparison result indicates that the motion speed of the UAV 110 is smaller than the first threshold motion speed in the first preset delay time, the UAV 110 is controlled to hover at a height at which the UAV 110 is positioned when the motion speed of the UAV 110 is detected smaller than the first threshold motion speed. If the comparison result indicates that the motion speed of the UAV 110 is greater than or equal to the first threshold motion speed after the first preset delay time, the UAV 110 is controlled to hover at a height at which the UAV 110 is positioned when the first preset delay time has expired.

Once the UAV 110 is hovering at the predetermined height, it means that the UAV 110 has entered a normal flight state. Then, the UAV 110 could fly to any positions, for example, the same position as in FIG. 1B, to perform any operations as intended by the user. For example, the UAV 110 can be equipped with a camera to capture an image. Specifically, during the capturing, since a capturing position and a capturing angle are the key factor to get a good image, the UAV 110 can hover at an intended position and perform steady flight from the intended position, thus obtaining the capturing position and shooting angle as required by the user. Then, in accordance with the capturing angle, the user can do a variety of activities including posing to get an ideal image.

Further specifics of the UAV 110 self-adjustments will be detailed in embodiments as illustrated in FIGS. 3-6.

Figure 2:
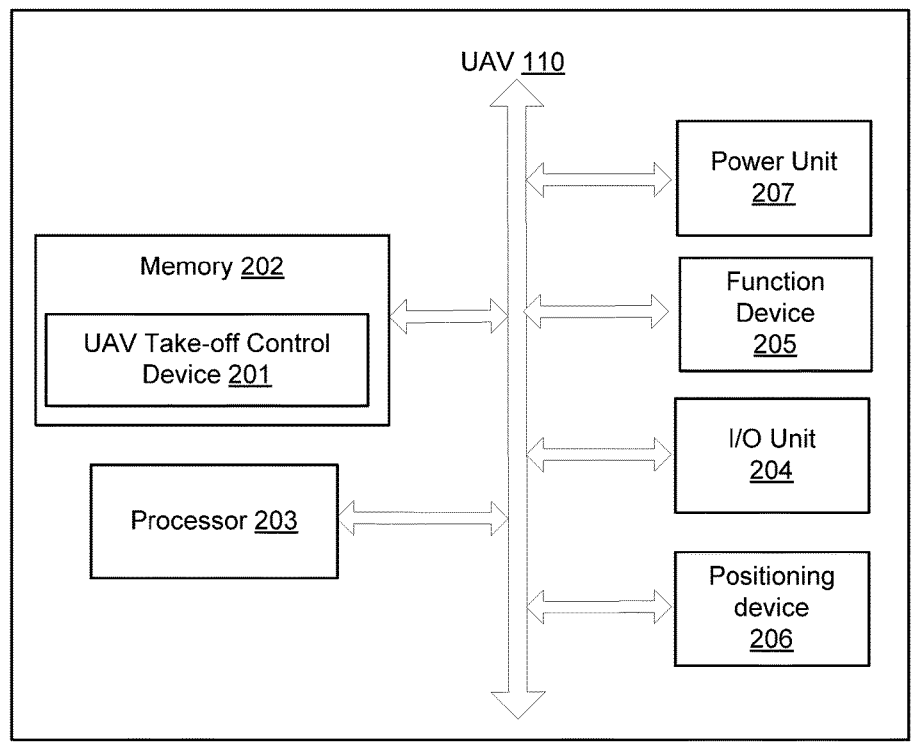
FIG. 2 is a block diagram of the UAV in the take-off system environment of FIGS. 1A-1C.

FIG. 2 is a block diagram schematically illustrating the UAV 110 in the system environment 100 of FIGS. 1A-1C.

As depicted in FIG. 2, the UAV 110 includes an UAV take-off control device 201, a memory 202, a processor 203, an input and output (I/O) unit 204, a function device 205, a positioning device 206 and a power unit 207. The UAV take-off control device 201, the memory 202, the processor 203, the I/O unit 204, the function device 205, the positioning device 206 and the power unit 207 are directly or indirectly connected to each other to achieve data transmission or exchange. For example, these elements may be electrically connected to each other via one or more communication buses or signal lines.

The UAV take-off control device 201 may include at least one software function module in a form of software or firmware stored in the memory 202 or the processor 203. The processor 203 is used for performing executable modules stored in the memory 202, such as software modules or computer programs included in the UAV take-off control device 201. After receiving the execution instruction, the processor 203 executes programs included in executable software function module. The method executable by the UAV disclosed in any embodiment of the present disclosure can be applied in the processor 203, or implemented by the processor 203.

The memory 202 is used to store various types of data of the UAV 110. The memory 202 may be an internal memory of the UAV 110, or a removable memory. For example, the memory 202 may be, but not limited to, random access memory (RAM), read only memory (ROM), programmable read-only memory (PROM), erasable read only memory (EPROM), electrically erasable read only memory (EEPROM) and the like. The memory 202 is used for storing program.

The processor 203 may be an integrated circuit chip with the signal processing capability. The processor 203 as described may be a general purpose processor, including a central processor (CPU), a network processor (NP). The processor 203 can also be a digital signal processor (DSP), application specific integrated circuit (ASIC), Field-programmable gate array (FPGA) or other programmable logic device, discrete gate or transistor logic, discrete hardware components. The processor 203 can execute or implement methods, steps and logic diagrams disclosed in embodiments of the present disclosure. The processor 203 may be a microprocessor or any conventional processor, etc.

The I/O unit 204 is used to receive data transmitted through wire or wireless path from a control terminal of the UAV 110, or the I/O unit 204 is used to transmit data of the UAV 110 through wire or wireless path to the control terminal of the UAV 110, so as to achieve interactions between the control terminal and the UAV 110.

The function device 205 may include an image capturing device, an LED light, a buzzer, an infrared-generating device and the like. The function device is used for the UAV 110 performing specific missions (for example, taking pictures, flashing lights, telemetering with infrared, etc.)

The positioning device 206 may include a positioning apparatus (for example, an inertial measurement unit, IMU), a navigation device (for example, GPS), a laser radar, an air pressure gauge, and the like. The positioning device 206 is used to obtain a current position of the UAV 110.

The power unit 207 may include an electronic speed governor, a motor, a rotor and the like. The electronic speed governor is electrically connected with the motor, and the rotor is mounted on the motor. The electronic speed governor may receive a signal transmitted from the processor 203 and control the motor to rotate, so as to drive the rotor to rotate. The electronic speed governor may obtain a rotation speed of the motor, and feed back the rotation speed of the motor to the UAV take-off control device 201.

In some embodiments, the UAV may have more or fewer components than those described above, but the present disclosure is not limited herein.

Figure 3:
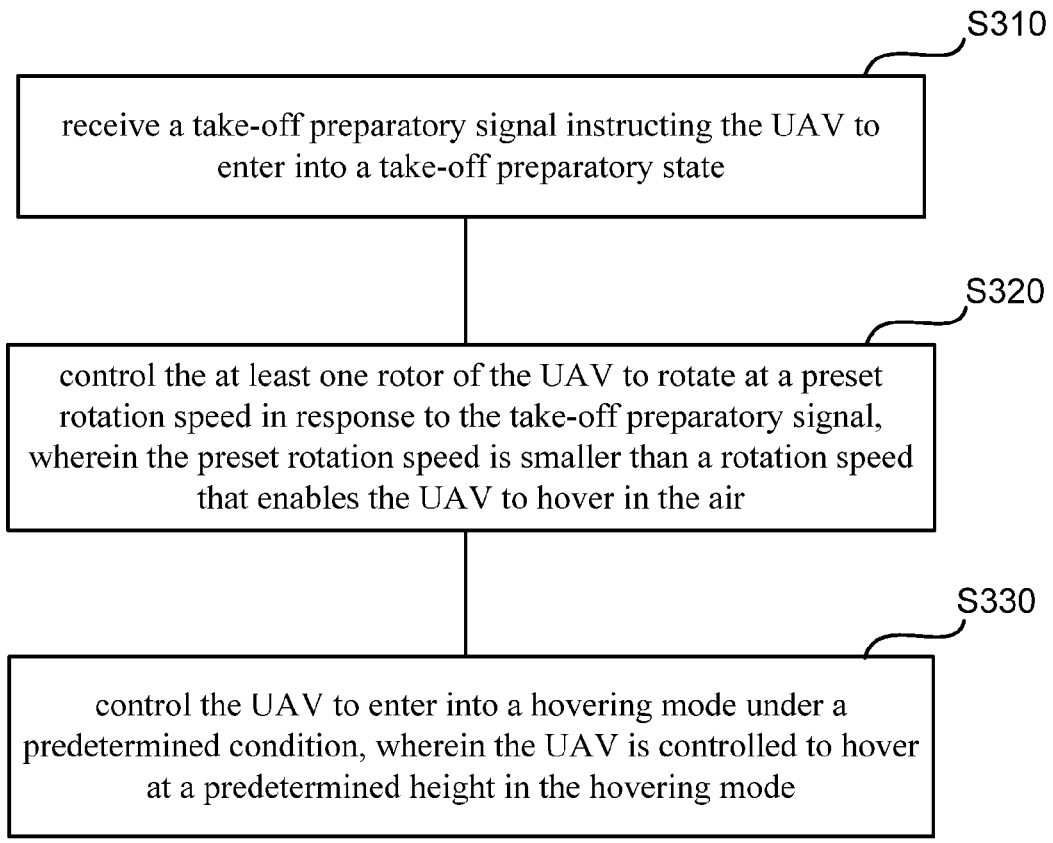
FIG. 3 is a flow chart of an exemplary method for controlling the UAV in the take-off system environment of FIGS. 1A-1C.

FIG. 3 is a flow chart of an exemplary method for controlling the UAV 110 of FIGS. 1A-1C, according to embodiments of the disclosure.

In Step S310, a take-off preparatory signal is received. The take-off preparatory signal instructs the UAV 110 to enter into a take-off preparatory state.

The processor 203 of the UAV 110 receives the take-off preparatory signal, wherein the take-off preparatory signal may be triggered when the UAV 110 is placed at a preset take-off height. Specifically, in some embodiments, the UAV 110 may be placed at a preset position. The preset position may be a position having a certain preset take-off height of a certain place, for example, the user's hand as shown in FIGS. 1A-1C. Other positions are also possible.

The UAV 110 can be placed in the preset position in many manners. In the example of FIG. 1A, the UAV 110 is lifted by the user's hand. In other words, the UAV 110, without propulsion from rotors, is placed on the preset position by the user. In other embodiments, the UAV 110 may be placed on the preset position through other devices, such as a mobile platform with a certain height.

As an example, the user sends a take-off preparatory instruction to the UAV 110. The take-off preparatory instruction refers to an instruction from the user that instructs the UAV 110 to be prepared for subsequent actions. The take-off preparatory instruction may be input by the user triggering a remote controller, triggering a button on the UAV 110, sending a voice command, performing a specific action in a capturing area of an image capturing device, or tapping the UAV 110. After receiving the take-off preparatory instruction, the take-off preparatory signal is generated. Then, the take-off preparatory signal is transmitted to the processor 203 of the UAV 110. Accordingly, the take-off preparatory signal is input to the processor 203 through a wireless communication unit in communication with the remote controller, a button, an image capturing device, a voice senor or an acceleration sensor.

Specifically, the remote controller may be a mobile phone, a computer, a remote control and other terminal equipment. As to inputting the take-off preparatory instruction by triggering the remote controller, the user may input the take-off preparatory instruction in the remote controller, and the remote controller may convert the take-off preparatory instruction to a take-off preparatory signal and transmit the take-off preparatory signal to the wireless communication unit of the UAV 110, and then the wireless communication unit may transmit the take-off preparatory signal to the processor 203. As to inputting the take-off preparatory instruction by triggering the button, the user may trigger the button, and the take-off preparatory instruction is transmitted to the processor 203 in the form of signal. As to inputting the take-off preparatory instruction by voice control, the user may input a specific voice command (for example, "take-off preparation", etc.), the UAV 110 receives the voice command as the take-off preparatory instruction through a voice sensor, converts the take-off preparatory instruction to a take-off preparatory signal and transmits the take-off preparatory signal to the processor 203. As to inputting the take-off preparatory instruction through other specific action (for example, a predetermined gesture, etc), the user may perform a specific action in a capturing area of the image capturing device, the image capturing device takes the acquired specific action as the take-off preparatory instruction, converts the take-off preparatory instruction to a take-off preparatory signal, and sends the take-off preparatory signal to the processor 203.

As to tapping the UAV 110 to input the take-off preparatory instruction, the UAV 110 detects, through the acceleration sensor, an amplitude signal produced by the tapping. More specifically, in a predetermined time period, the UAV 110 continuously detects a preset number of the amplitude signals that is greater than a preset threshold, and thus identifies it as the take-off preparatory instruction. No limitations are set to the predetermined time period. For example, the predetermined time period can be any value between 1 to 5 seconds. Additionally, when the acceleration sensor detects the amplitude signal, a low-pass filtering process is performed to the amplitude signal: filtering out part of the high-frequency noise. Then, a determination is made if the amplitude signal after the filtering noise is greater than a preset threshold. In the present embodiment, no limitations are set to a cut-off frequency of the low-pass filtering. For example, the cut-off frequency could be 40 Hz, or may be other value. Also, the preset threshold of the amplitude signal may be set depending on the circumstances. For example, it may be an amplitude corresponding to an acceleration greater than 2.5 g, and g is the gravitational acceleration.

In some embodiments, upon receiving the take-off preparatory instruction, the UAV 110 does not immediately perform subsequent actions until a preset take-off preparatory time has passed. During the preset take-off preparatory time, the user places the UAV 110 on the preset position with a certain height. That is, prior to placing the UAV 110 on the preset position, the take-off preparatory instruction could be input/transmitted to the UAV 110 at a position different from the preset position. For example, when tapping the UAV 110 to input the take-off preparatory instruction, the user's hand is at a first position with lower height (such as ground) and convenient for tapping the UAV 110, and within the preset take-off preparatory time, the user places the UAV on a second position (i.e., the preset position) with a higher height. The aforementioned example is not intended to limit the embodiment, for example, within the preset take-off preparatory time, no actions are performed to the UAV 110. In this embodiment, a first timer or a first timing program can be used to count the preset take-off preparatory time. For example, the preset take-off preparatory time may be 2 seconds.

Specifically, upon receiving the take-off preparatory instruction sent from the user, the first timer starts counting a first preset delay time and sends a reminder signal after a specified time to remind the user to perform subsequent actions. The reminder signal may be an audible reminder signal or an optical reminder signal, which is not limited in the present embodiment.

As for the optical reminder signal, the processor 203 controls flashes of an indicating lamp to send the optical reminder signal. Additionally, the indicating lamp would flash faster when it is closer to the end of the first preset delay time. Alternatively, the color of the indicating lamp is changed in response to the waiting time. For example, within a specified length of time after receiving the take-off preparatory instruction, the color of the indicating lamp is changed from the original green to red.

As for a voice prompt signal, the processor 203 could control a buzzer to send the voice prompt signal. Additionally, the sound frequency of the buzzer would become higher when it is closer to the end of the first preset delay time. The specific prompt is not meant to restrict the embodiment and can be set depending on actual needs.

Further, the first timer could be set in many manners. For example, the countdown reminder could be set to last a specified length of time after the end of the first preset delay time. Alternatively, the first timer could start when the take-off preparatory instruction is received.

Further, after receiving the take-off preparatory signal, the processor 203 may check a work status of the UAV 110. When the checking result is not qualified, the UAV 110 may not perform subsequent take-off actions. When the checking result is qualified, the UAV 110 continues to perform the subsequent take-off actions, so as to ensure the UAV 110 takes off under a normal working condition.

In some embodiments, various working parameters of the UAV 110 may be checked to determine whether the UAV 110 meets requirements of normal flight. Specifically, if a checking result of any one (or one specific) working parameter is not qualified, the working status of the UAV 110 is determined to be not qualified for taking off. Alternatively, when the number of working parameters which are not qualified reaches a preset number, the working status of the UAV 110 is determined to be not qualified for taking off. However, the method of how to determine the working status of the UAV 110 is not limited in the present disclosure.

Specifically, checking work parameters of the UAV 110 may include checking one or more of the following: a power-on time of the UAV 110, a motion state of the rotor, whether the UAV 110 is in a no-fly area, whether the inertial sensor is in an active status, and/or whether the UAV 110 is stationary. In some embodiments, the working parameters to be checked may be others, for example, whether the sensors (such as the ultrasonic sensor, GPS and the barometer) are in active effective states, whether parameters (such the speed, the acceleration and the displacement) are in reasonable ranges, and whether the additional devices (such as the indicating lamp and the image capturing device) can work properly, etc.

After being power-on, the UAV 110 requires a certain preheat and initialization time. It may cause the UAV 110 out of control if the UAV 110 takes off before the initialization is completed. Thus, after receiving the take-off preparatory signal, the power-on time of the UAV 110 may be checked. For example, the power-on time of the UAV 110 may be checked by measuring whether the UAV 110 has been powered on for more than a preset power-on period. If yes, it is considered that the checking result of the power-on time is qualified. Otherwise, the checking result of the power-on time is not qualified. In some embodiments, the preset power-on time may be 12 seconds.

The motion state of the rotor may be checked by measuring whether a rotation speed of the motor controlling the rotor is zero. If the rotation speed of the motor is zero, it is considered the rotor doesn't rotate and the checking result is qualified. If the detected rotation speed of the motor is not zero, it is consider the rotor rotates and the checking result is not qualified. The UAV 110 should take off while it is not in a flying state, wherein the flying of the UAV 110 needs the rotor to rotate. Thus, by checking the motion state of the rotor, it can be determined whether the UAV 110 is in a flying status.

It can be determined whether the UAV 110 is in a no-fly area by checking whether a space where the UAV 110 currently locates is a no-fly area. In some embodiments, the current latitude and longitude of the UAV 110 are obtained, and it is determined whether the obtained latitude and longitude of the UAV 110 is within a no-fly area stored in the UAV 110. If yes, the UAV 110 is in a no-fly area and the checking result of whether the UAV 110 is in a no-fly area is not qualified. Otherwise, the checking result is qualified.

Checking whether the inertial sensor is in an active status may include: obtaining a sensing parameter of the inertial sensor, and checking whether the sensing parameter is within a preset parameter range. If yes, the inertial sensor is considered to be in an active status, and the checking result of the inertial sensor is qualified. If no, the inertial sensor is considered to be not in an active status, and the checking result of the inertial sensor is not qualified. For example, as to checking whether the accelerometer is in an active status, acceleration data of three sensitive axis directions of the accelerometer is may be read. In some embodiments, the three sensitive axis directions may include the front, the right and the bottom of the UAV 110. However, the three sensitive axis directions are not limited herein. In other embodiments, the three sensitive axis directions may be three axes, or coordinate axes of the UAV body which are orthogonal relation distributed. If there is an acceleration greater than a preset acceleration in the acceleration data of the three sensitive axis directions, the accelerometer is considered to be not in an active status and the checking results of the accelerometer is not qualified. In some embodiments, the preset acceleration may be 5 g, and g is the gravitational acceleration. The preset acceleration is not meant to restrict the embodiment and can be set depending on actual needs.

It can be determined whether the UAV 110 is stationary by checking the motion speed of the UAV 110 itself. If the motion speed of the UAV 110 is greater than a threshold speed, it is considered the UAV 110 is not stationary. If the motion speed of the UAV 110 is smaller than or equal to the checking threshold speed, it is considered that the UAV 110 is stationary, which is qualified for subsequent operations.

In some embodiments, checking the motion speed of the UAV 110 may include checking speed components in three-dimensional coordinate directions. Specifically, the speed components of the UAV 110 in three-dimensional coordinate directions may be obtained in a preset period. When a speed component in any one coordinate direction is greater than a corresponding threshold speed, it is considered the UAV 110 is not stationary, and thus is not qualified.

Figure 4:
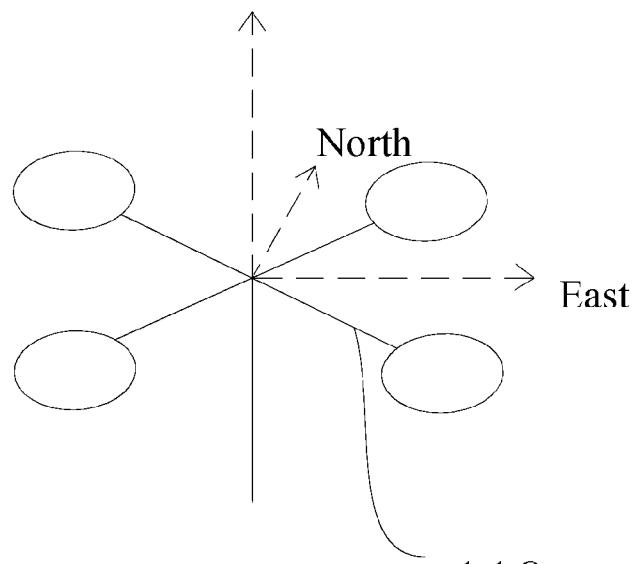
FIG. 4 is a diagram of a three-dimensional coordinate system of the UAV 110 according to an embodiment.

As shown in FIG. 4, in some embodiments, the three-dimensional coordinate directions of the UAV 110 are an eastward direction, a southward direction, and an upward direction of the UAV 110. In some embodiments, the preset checking period may be 50 ms, the checking threshold speed for the speed component in the eastward direction or the westward direction is 0.3 m/s, the checking threshold speed for the speed component in the southward direction or the northward direction is 0.3 m/s, and the checking threshold speed for the speed component in the upward direction or the downward direction is 0.3 m/s. For example, within 50 ms, it is found that the UAV 110 has a motion speed of 0.4 m/s in the eastward direction. Since 0.4 m/s is greater than the checking threshold speed of 0.3 m/s in the eastward direction, the checking results is that the UAV 110 is not stationary, and the checking result is not qualified.

In summary, as kinetic parameters of the UAV 110 are critical for achieving a stable fight, the UAV 110 should be kept in a relatively stationary state before take-off, so as to avoid excessive speed deviation which may result in that the speed is out of control after take-off. Thus, in the embodiments as discussed above, it is preferable to check whether the UAV 110 is stationary before take-off.

Further, in some embodiments, if it is detected the UAV 110 has an unqualified working parameter, the corresponding checking result may be feed back to the user. Thus, the user is informed of which working state is unqualified and the cause of the failure, and the user can make an appropriate response. The checking result may be fed back to the user when any one work parameter is unqualified, or when a specific working parameter is unqualified. Moreover, the manner in which the UAV 110 feeds the checking result back to the user is not limited in embodiments of the present disclosure. For example, feedback information may be transmitted to a related control device which is wirelessly connected with the UAV 110, or corresponding indicating devices set on the UAV 110, such as the indicating lamp, are used to feed back the checking result to the user.

As shown in FIG. 3, in Step 320, said at least one rotor of the UAV 110 is controlled to rotate at a preset rotation speed in response to the take-off preparatory signal, wherein the preset rotation speed is smaller than a rotation speed that enables the UAV 110 to hover in the air.

Specifically, after receiving the take-off preparatory signal, the processor 203 controls the rotors to rotate at a preset rotation speed based on the take-off preparatory signal.

A constant small power may be output to control the rotor of the UAV 110 in order to rotate at the preset rotation speed. Specifically, the preset rotation speed is smaller than a rotation speed that enables the UAV 110 to hover in the air, and it refers to a state where the rotors operate at a relatively low speed of rotation. The relatively low speed is safe. Generally, at the relatively low speed, even if the rotor is accidentally touched by the user, it will not harm the user.

In one aspect, before the rotors enter into a fast rotation, the initial slower idle speed rotation would give the user a psychological buffer period to adapt to the subsequent fast rotation. In another aspect, the relatively low speed can be used to check if the rotors and corresponding control systems are working properly.

No limitations are set to the preset rotation speed. In some embodiments, the preset rotation speed may be the idle rotation speed of the UAV 110, or a rotation speed greater than the idle rotation speed but smaller than a rated rotation speed of the UAV 110. The idle rotation speed of the UAV 110 is a very low rotation speed. For example, the idle speed rotation can be ranged from 110 to 2000 rev/min.

As shown in FIG. 3, in Step S330, the UAV 110 is controlled to enter into a hovering mode under a predetermined condition, wherein the UAV 110 is controlled to hover at a predetermined height in the hovering mode.

In some embodiments, when the rotor has rotated at the preset rotation speed for a period of time, the UAV 110 is controlled to enter into a hovering mode. The user may release the UAV 110 when the UAV 110 starts to enter into the hovering mode. For example, when the user holds the UAV 110 with his hand, the user could withdraw his hand. In some embodiments, when the rotor rotates at the preset rotation speed, the position of the UAV 110 may be adjusted again.

In some embodiments, when the rotor is about to stop rotating at the preset rotation speed and enters into the hovering mode, the UAV 110 may send a rotor acceleration prompt signal, and the acceleration prompt signal may be an audible reminder signal or an optical reminder signal, such that the user may know the UAV 110 is about to perform next actions.

In some embodiments, the motion speed of the UAV 110 may be used to determine whether to control the UAV 110 to enter into the hovering mode. For example, in some embodiments, the predetermined condition, under which the UAV 110 is controlled to enter into the hovering mode, is that a detected motion speed of the UAV 110 is greater than or equal to a second threshold motion speed. Alternatively, the predetermined condition might be that a second preset delay time expires, even the motion speed of the UAV 110 is still smaller than a second threshold motion speed.

Figure 5:
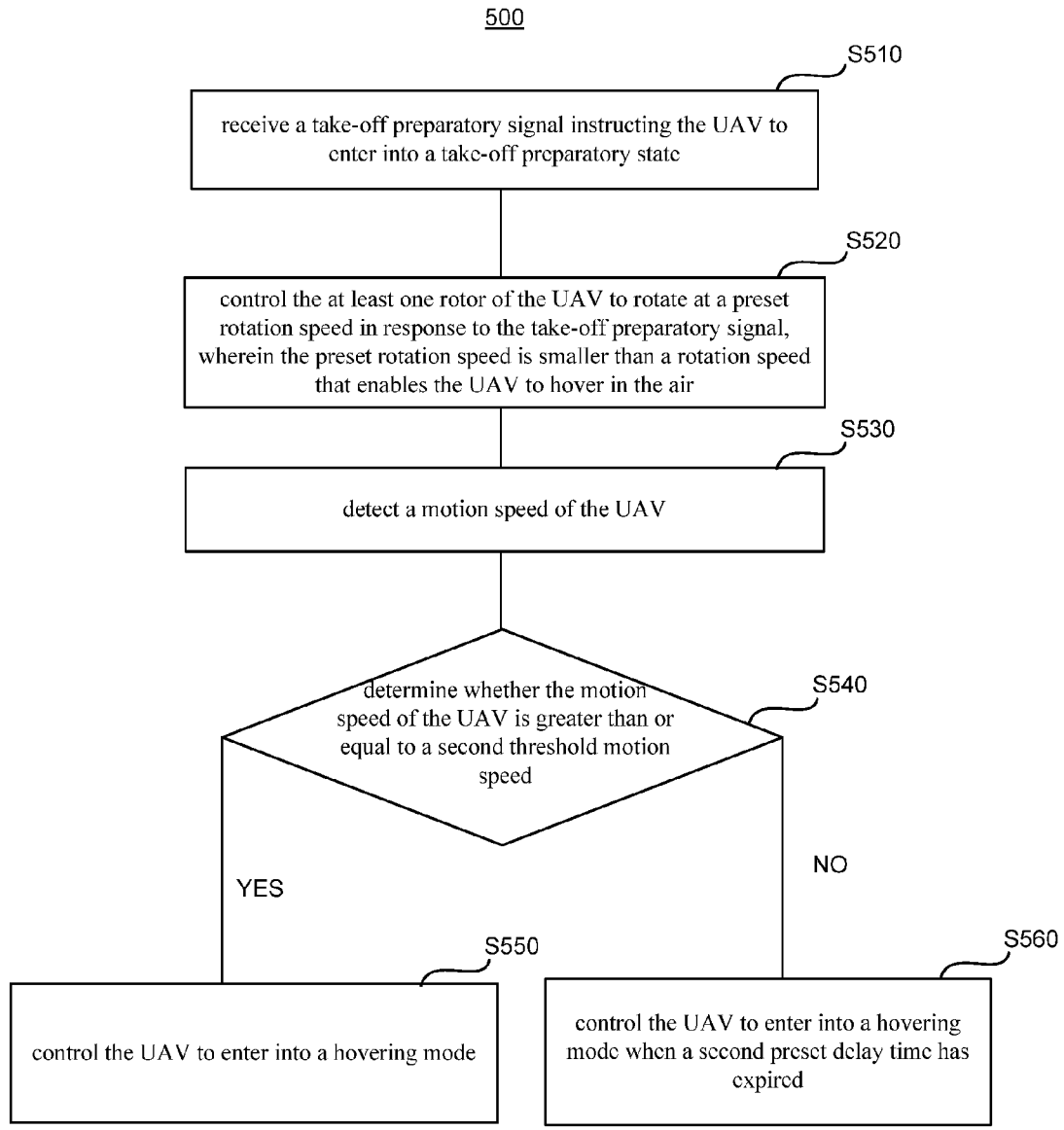
FIG. 5 is a flow chart of another exemplary method for controlling the UAV in the take-off system environment of FIGS. 1A-1C.

Further, as shown in FIG. 5, in another embodiment of the present invention, the step 330 described above in FIG. 3 may further include Steps S530-S560.

Other steps in FIG. 5, including Steps 510-520, are substantially identical to the Steps 310-320 of FIG. 3, which will not be elaborated here.

In Step S530, a motion speed of the UAV 110 is detected. For example, when the rotor of the UAV 110 is controlled to rotate at the preset rotation speed, the motion speed of the UAV 110 is detected. When the motion reaches a predetermined condition, the UAV 110 is controlled to enter into the hovering mode.

In some embodiments, when the user wants the UAV 110 to enter into the hovering mode, a relative position/speed change may be made to the UAV 110. In some embodiments, the user makes a certain displacement to the UAV 110 and then releases the UAV 110 to create the relative position change, or the user directly releases the UAV 110 to create the relative position change, thus the UAV 110 will have a certain motion speed. The motion speed may be generated before the UAV 110 is released or after the UAV 110 is released, according to the user's specific operational decisions Specifically, when the rotors start to operate at the idle speed rotation, the motion speed of the UAV 110 is detected. The motion speed of the UAV 110 can be obtained through combined measurements of multiple sensors of the UAV 110. For example, the motion speed of the UAV 110 is obtained by an accelerometer integration. Since a drift problem is present in the accelerometer, a long integration process will lead to a big deviation to the velocity. Thus, an instantaneous motion speed of the UAV 110 can be obtained through GPS, an ultrasonic sensors or a barometer to amend the integration deviation of the accelerometer in order to get a more accurate velocity of the UAV 110.

Specific amendments may be implemented by Kalman filter algorithm. Kalman filter algorithm would make the best estimate of the motion speed of the UAV 110 by combining motion speed outputs from the accelerometer, the GPS and the ultrasonic sensors.

In some embodiments, the motion speed of the UAV 110 is mainly determined by the motion speed downward or upward in vertical direction, namely the vertical velocity. A user could withdraw his hand from holding the UAV 110 and let the UAV 110 to fall, in order to create the vertical velocity of the UAV 110. Alternatively, the user can use a hand to lift the UAV 110 up or down to create the vertical velocity of the UAV 110.

When the motion speed is mainly along the vertical direction, the instantaneous vertical velocity measured through the GPS, the ultrasonic sensor or the barometer might be combined with the initial velocity obtained by the integration of the accelerometer to obtain the best velocity estimate of the UAV 110.

In Step S540, the motion speed of the UAV 110 is compared with a second threshold motion speed to determine whether the motion speed of the UAV 110 is greater than or equal to the second threshold motion speed.

When the motion speed of the UAV 110 is greater than or equal to the second threshold motion speed, Step S550 is performed. In Step S550, the UAV 110 is controlled to enter into a hovering mode.

Namely, in Step S550, the predetermined condition, under which the UAV 110 is controlled to enter into the hovering mode, is that the motion speed of the UAV 110 is greater than or equal to the second threshold motion speed. In some embodiments, the second threshold motion speed is ranged from 0.2 m/s to 1 m/s, for example, 0.3 m/s. The second threshold motion speed can be set by the user according to actual situations, and is not limited by the embodiments.

When the motion speed of the UAV 110 is smaller than the second threshold motion speed within a second preset delay time, Step S560 is performed. In Step S560, if a second preset delay time has expired since the at least one rotor rotates at the preset rotation speed, the UAV 110 is controlled to enter into a hovering mode.

Namely, in Step S560, the predetermined condition, under which the UAV 110 is controlled to enter into the hovering mode, is that the second preset delay time has expired even though the motion speed of the UAV 110 is smaller than the second threshold motion speed within the second preset delay time. That is, after the rotor starts to rotate, the motion speed detected during the second preset delay time may be always smaller than the second threshold motion speed. In this case, after the second preset delay time has expired, in the Step S560, it is still performed to control the UAV 110 to enter the hovering mode. The second preset delay time can be set according to actual situations. For example, the second preset delay time may be 3 seconds.

In some embodiments, other methods may be used to determine whether to control the UAV 110 to enter into the hovering mode. For example, it is determined based on whether the acceleration of the UAV 110 reaches a certain threshold or is within a certain acceleration range. It is determined based on the displacement change and the height change of the UAV 110 obtained by the ultrasonic sensor, based on the surrounding environment change, the speed change, the displacement change and the height change obtained by the image capturing device, or based on data obtained by other sensors, such as GPS and the barometer.

Figure 6:
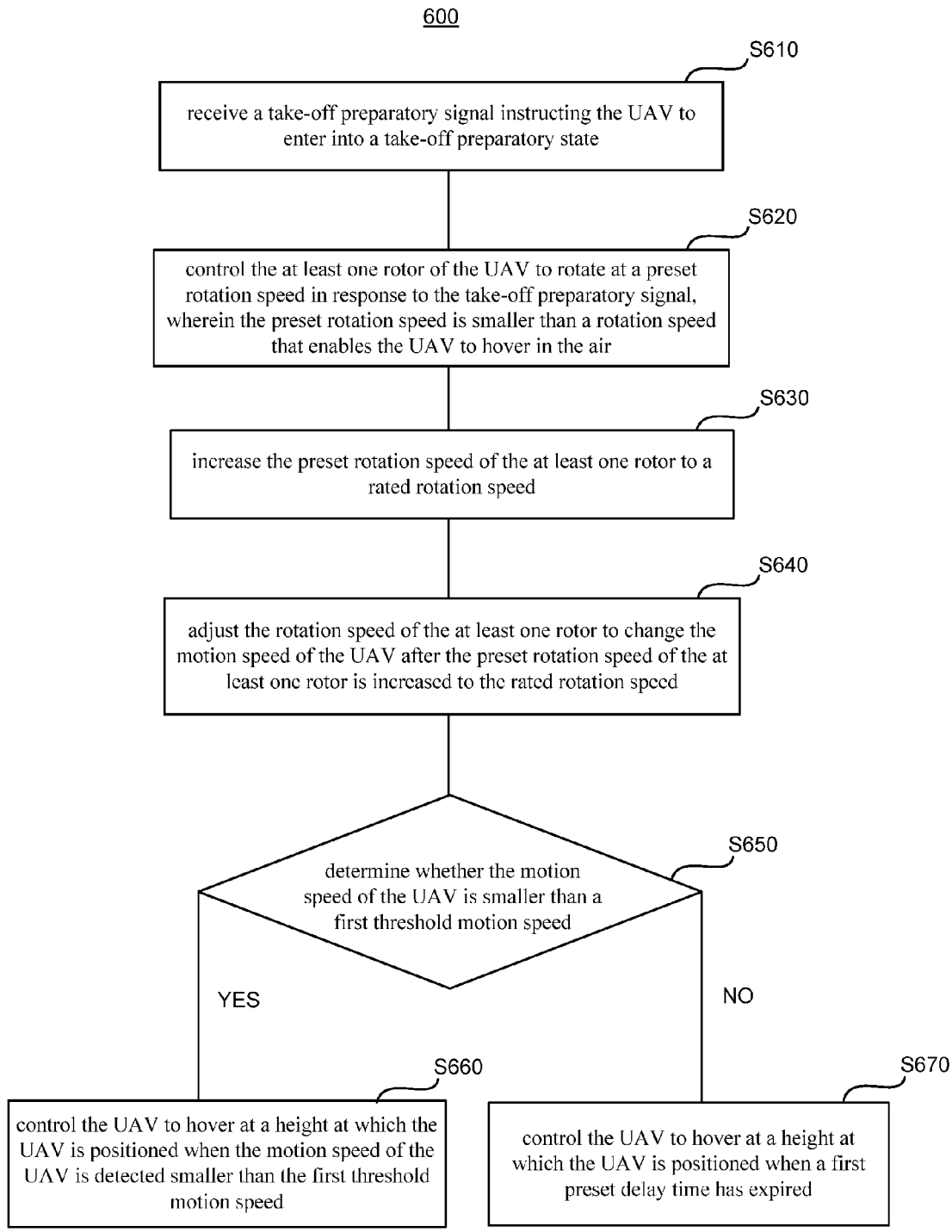
FIG. 6 is a flow chart of another exemplary method for controlling the UAV to enter into a hovering mode.

Further, as shown in FIG. 6, the method described above may further include Steps S630-S670.

Other steps in FIG. 6 including Steps 610-620 are substantially identical to the Steps 310-320 of FIG. 3, which will not be elaborated here.

In Step S630, the preset rotation speed of the at least one rotor is increased to a rated rotation speed.

The rated rotation speed of the UAV 110 is an estimated rotation value for the UAV 110 to hover. The rated rotation speed may be empirically obtained based on a plurality of pre-flights of the UAV 110. Specifically, in the plurality of pre-flights, the UAV 110 is controlled to hover in the air, and a plurality of rotation speeds of the rotor can be obtained and recorded. For example, an average value of the plurality of rotation speeds is taken as the rated rotation speed, or one of the plurality of rotation speeds is taken as the rated rotation speed. In some embodiments, other calculation methods may be applied on the plurality of rotation speeds to obtain the rated rotation speed.

In some embodiments, UAV 110 would record rotors' rotation speed for steady hover during each flight, which was saved in a memory, for example, the memory 202 shown in FIG. 2. The record may be performed at regular time interval, or it can be recorded when landing. As an example, the rotation speed for steady hover is saved in a non-volatile memory, such that, at each take-off time, the rotation speed stored in the non-volatile memory for steady hover during the previous flight is taken as the rated rotation speed.

The processor 203 obtains the rated rotation speed stored in the memory 202, and increases the rotation speed of the rotor to a rated rotation speed. Since the rated speed refers to an estimated rotation speed that enables the UAV 110 almost to hover, the lifting force generated by the rotor can make the UAV 110 to largely hover. It can be understood that, when the UAV 110 hovers, the motion speed in the vertical direction of the UAV 110 is zero, or almost zero.

The acceleration of the rotors is performed in many ways. For example, if the rotors are the square wave modulation driven rotors, the rotation speed of rotors can be exponentially accelerated to a specified speed. If the rotors are FOC ESC driven rotors, the rotors can accelerate in other forms. Specific acceleration mode is not set as limit by the embodiment.

In Step S640, after the preset rotation speed of the at least one rotor is increased to the rated rotation speed, the rotation speed of the at least one rotor is adjusted in order to change the motion speed of the UAV 110.

Since the rotation speed of the UAV 110 steady hover is affected by various factors including altitude, the weight of the UAV 110, propeller parameters and the initial motion speed caused by the mobile platform, there may be a deviation between a required rotation speed for a stable hover flight in the current flight and a stored rated speed for a stable hover flight in the previous flight.

Thus, after being increased to the rated speed, the rotation speed of rotors of the UAV 110 is adjusted, so as to adjust the motion speed of the UAV 110. This aims to reduce the deviation between the required rotation speed for a stable hover flight in the current flight and the previously stored rated speed, and make the UAV 110 to enter into a hovering state.

In Step S650, the motion speed of the UAV 110 is compared with a first threshold motion speed to determine whether the motion speed of the UAV 110 is smaller than the first threshold motion speed.

If the motion speed of the UAV 110 is smaller than the first threshold motion speed, Step S660 is performed.

If the motion speed of the UAV 110 is greater than or equal to the first threshold motion speed, and if a first preset delay time has expired, Step S670 is performed.

The sampling period and the first threshold motion speed can be set according to actual situations, and are not limited in the embodiments. For example, the sampling period may be 50 ms, and the vertical velocity of the first threshold motion speed may be 0.05 m/s.

In Step S660, the UAV 110 is controlled to hover at a height at which the UAV 110 is positioned when the motion speed of the UAV 110 is detected smaller than the first threshold motion speed.

Specifically, a plurality of motion speeds of the UAV 110 may be obtained in a sampling period. In some embodiments, when the plurality of motion speeds in the sampling period are all smaller than the first threshold motion speed, the motion speed of the UAV 110 is considered to be smaller than the first threshold motion speed. In some embodiments, when an average value of the plurality of motion speeds is smaller than the first threshold motion speed, the motion speed of the UAV 110 is considered to be smaller than the first threshold motion speed. In some embodiments, when a number of the motion speeds greater than the first threshold motion speed reaches a certain number, the motion speed of the UAV 110 is considered to be smaller than the first threshold motion speed. In some embodiments, the sampling period may also be short, and only one motion speed is sampled.

If the motion speed of the UAV 110 is adjusted to be smaller than the first threshold motion speed within the first preset delay time, it is considered the UAV 110 enters into the hovering state, and the take-off of the UAV 110 ends. The UAV 110 is controlled to hover at a predetermined height at which the UAV 110 is positioned when the motion speed of the UAV 110 is detected smaller than the first threshold motion speed.

The height of the UAV 110 can be detected through the ultrasonic sensor set on the UAV 110. Or the height at which the UAV 110 hovers can be obtained by other means. Generally, in some embodiments, the height at which the UAV 110 hovers is similar to the preset take-off height.

In Step S670, the UAV 110 is controlled to hover at a height at which the UAV 110 is positioned when the first preset delay time has expired.

As understood, in some embodiments, the motion speed of the UAV 110 in each sampling period of the first preset delay time is greater than or equal to the first threshold motion speed. Thus, it fails to meet the requirement that the motion speed of the UAV 110 is adjusted to be smaller than the first threshold motion speed within the first preset delay time.

Corresponding to Step S670, in some embodiments, the motion speed of the UAV 110 is greater than or equal to the first threshold motion speed in each sampling period of the first preset delay time. For example, there is a motion speed greater than or equal to the first threshold motion speed in each sampling period, or the average value of each sampling period is greater than or equal to the first threshold motion speed, or a number of the motions speeds smaller than the first threshold motion speed doesn't reaches a certain number in each sampling period.

If the motion speed of the UAV 110 in each sampling period of the first preset delay time is greater than or equal to the first threshold motion speed, it is determined the take-off of the UAV 110 ends at the time when the first preset delay time expired. Then, the UAV 110 is controlled to hover at the height at which the UAV 110 is positioned when the first preset delay time has expired.

In other words, if the rated rotation speed of the rotor doesn't make the UAV 110 enter into the hovering state before the first preset delay time expires, the take-off of the UAV 110 is determined to end at the time when the first preset delay time has expired, and the height at which the UAV 110 is positioned at this moment is recorded. Eventually, the UAV 110 is controlled to hover at the recorded height when the take-off of the UAV 110 ends. As an example, it is recorded that the height at which the UAV 110 hovers when the take-off of the UAV 110 ends is 4 m. If the current height of the UAV 110 is greater than 4 m, according to step 670, the rotation speed of the motor is controlled to decrease, so as to decrease the rotation speed of the rotor and decrease the height of the UAV 110 to 4 m.

In some embodiments, the UAV 110 may have an initial motion speed which is too big for obtain immediate hovering. For example, the UAV 110 may have a large motion speed after the user releases the UAV 110. After the rotation speed of the rotor is increased to the rated speed, it may still take too long time to adjust the motion speed of the UAV 110 in order to control the UAV enter into a hovering state. This is partially because the UAV 110 adopts a smaller increment/decrement, such as a first rate, to change the rotation speed of the rotor.

In the process of controlling the UAV 110 to hover at the height at which the UAV 110 is positioned when the first preset delay time has expired, a larger increment/decrement, such as a second rate, may be used to change the rotation speed of the rotor. The second rate is greater than the first rate, such that the UAV 110 can obtain hovering much more quickly, and the time required to hover is shortened.

In embodiments of the present disclosure, by setting the first preset delay time and controlling the initial speed of the UAV 110 when the UAV 110 is released, a height difference between the height at which the UAV 110 hovers and the preset take-off height, and a displacement between the height at which the UAV 110 hovers and the preset position are controllable, so that the height of the UAV 110 at the time when the take-off of the UAV 110 ends is controllable.

The first preset delay time can be set according to actual situations. In some embodiments, the first preset delay expires at time when 6 seconds has expired after the take-off preparatory signal is received.

In addition to the flow charts shown in FIGS. 3, 5 and 6, the present disclosure also incorporate certain mechanisms/steps for UAV's safety considerations, as described in details below.

In some embodiments, once the rotors start rotating, a real-time rotation speed of the rotors is detected. When detecting that the rotation speed of the rotors is abnormal, the rotation of the rotors is terminated.

For example, during the rotation of the rotors, the rotation speed of the rotor will change abruptly if bumping to other objects. In response, termination of the rotation of the rotors will avoid occurrence of personnel injury or damage to other objects or the rotors. Therefore, the safety of the environment and the UAV 110 are ensured.

In alternative embodiments, the abnormality of the rotation speed of the rotors may be detected by measuring electric current changes of drive motors of the rotors. When the rotation speed of the rotors drops under normal flight control, the electric current of the drive motors of the rotors will decrease. While when the rotors collide with other objects, the rotation speed of the rotors is forced to decrease and the rotation speed of the drive motor is forced to decrease, which will further cause the current to rise. Accordingly, as a safety measure, if the electric current of the drive motor is detected to rise abruptly, the rotors stop rotating.

In some embodiments, when the rotors start rotating, a real-time detection of altitude of the UAV 110 is performed to get a tilting angle of the UAV 110. In addition, when the detected tilting angle is greater than an angle threshold, the rotors are controlled to stop rotating. The angle threshold may be set according to actual demands, such as 90 degrees. When there is an occurrence of a tilt or a flip above the angle threshold to the UAV 110, the rotors are controlled to stop rotating, thus stopping the process of take-off.

Specifically, the altitude of the UAV 110 can be measured by an inertial measurement unit (IMU) including gyroscopes and accelerometers.

It should be understood that the above steps of stopping rotor may be performed immediately after certain emergency conditions are detected, thus stopping or interrupting the process of UAV's take-off, hover, or other operations.

In addition to the safety considerations, the present disclosure also addresses certain false operations of UAV's user. For example, due to the danger or fear arising from the high speed rotation of the rotors, the user may throw away the UAV 110 because of a shock or other reasons. If UAV 110 is thrown away, a tilt or a flip above the angle threshold occurs, the UAV 110 stops take-off by controlling the rotors to stop operating.

Figure 7:
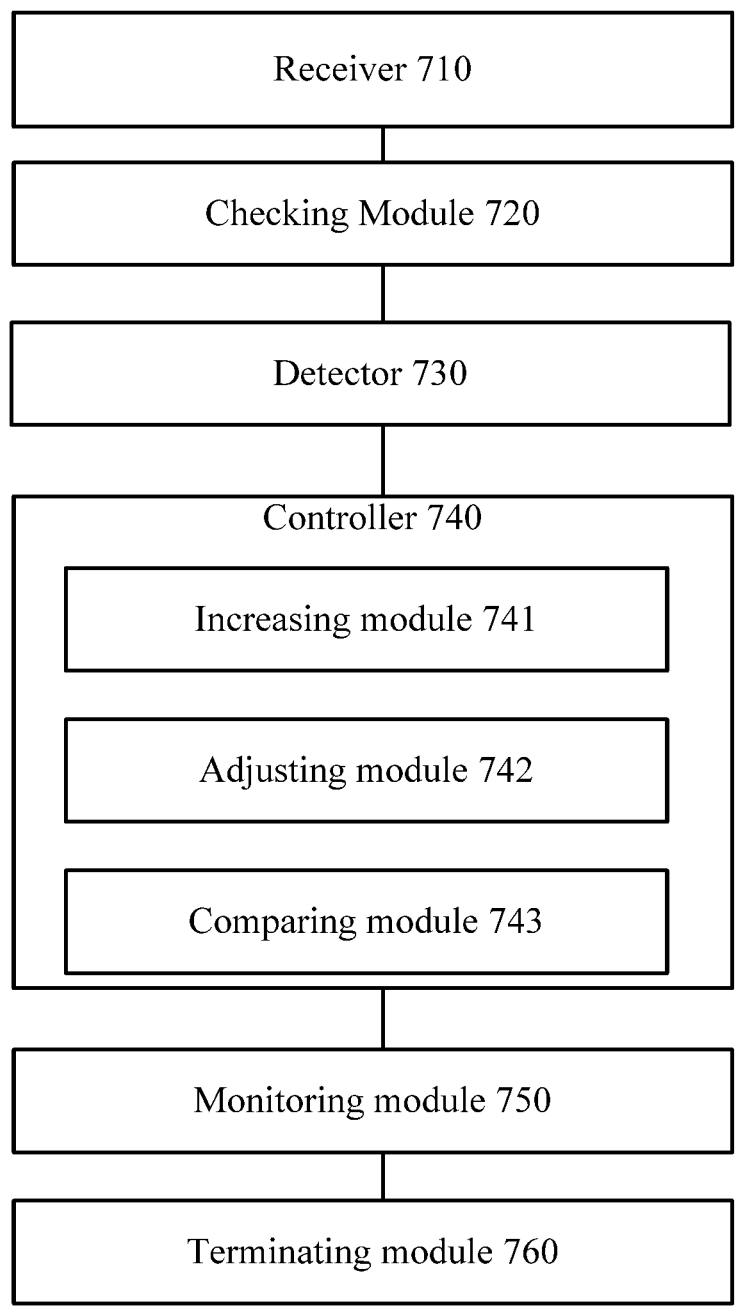
FIG. 7 is a block diagram of an exemplary control device in the UAV, as shown in FIG. 2.

FIG. 7 provides a schematic view of the structure of the take-off control device 201 shown in FIG. 2.

As shown in FIG. 7, the take-off control device 201 includes a receiver 710 and a controller 740.

The first receiver 710 is configured to receive a take-off preparatory signal instructing the UAV 110 to enter into a take-off preparatory state. For example, the receiver 710 receives the take-off preparatory signal from a wireless communication unit in communication with a remote controller, a button, an image capturing device, a voice senor or an acceleration sensor; and the take-off preparatory signal is generated in response to a take-off preparatory instruction input into the remote controller, the button, the image capturing device, the voice senor or the acceleration sensor by a user.

In some embodiments, the take-off control device 201 may further include a first timer (not shown in FIG. 7) configured to count a preset preparatory time upon receiving the take-off preparatory signal. During the preset take-off preparatory time, the user may places the UAV 110 on a preset position with a certain height. The take-off control device 201 may further include a reminding module configured to send a reminder to a user when the preset preparatory time has expired.

The controller 740 is configured to control the at least one rotor of the UAV 110 to rotate at a preset rotation speed in response to the take-off preparatory signal. The preset rotation speed is smaller than a rotation speed that enables the UAV 110 to hover in the air.

The controller 740 is further configured to control the UAV 110 to enter into a hovering mode under a predetermined condition. The UAV 110 is controlled to hover at a predetermined height in the hovering mode.

In some embodiments, the take-off control device 201 further includes a detector 730 configured to detect a motion speed of the UAV 110. The controller 740 is further configured to control the UAV 110 to enter into the hovering mode when the motion speed of the UAV 110 is greater than or equal to a second threshold motion speed, or the motion speed of the UAV 110 is smaller than a second threshold motion speed after a second preset delay time expires.

In order to control the UAV 110 to enter into a hovering mode, in some embodiments, the controller 740 includes an increasing module 741 and an adjusting module 742. The increasing module 741 is configured to increase the preset rotation speed of the at least one rotor to a rated rotation speed. The adjusting module 742 is configured to adjust the rotation speed of the at least one rotor to change the motion speed of the UAV 110 after the preset rotation speed of the at least one rotor is increased to the rated rotation speed.

Further, in order to control the UAV 110 to hover at a predetermined height, the take-off control device 201 further includes a comparing module 743 configured to compare the motion speed of the UAV with a first threshold motion speed.

When the comparison result indicates that the motion speed of the UAV is smaller than the first threshold motion speed, the predetermined height at which the controller 740 controls the UAV 110 to hover is the height at which the UAV 110 is positioned when the motion speed of the UAV 110 is detected smaller than the first threshold motion speed.

When the comparison result indicates that the motion speed of the UAV 110 is greater than or equal to the first threshold motion speed after a first preset delay time has expired, the predetermined height at which the controller 740 controls the UAV 110 to hover is the height at which the UAV 110 is positioned when the first preset delay time has expired.

In order to reduce the time required to hover, the adjusting module 742 is further configured to: adjust the rotation speed of the at least one rotor at a first rate within the first preset delay time; and adjust the rotation speed of the at least one rotor at a second rate if the comparison result indicates that the motion speed of the UAV 110 is greater than or equal to the first threshold motion speed even after the first preset delay time has expired. The second rate is greater than the first rate.

In some embodiments, after receiving the take-off preparatory signal, a work status of the UAV 110 may be checked, so as to ensure the UAV 110 takes off under a normal working condition. The take-off control device 201 may further include: a checking module 720 configured to check a working status of the UAV 110. The controller 740 may control the at least one rotor of the UAV 110 to rotate at a preset rotation speed when no failure or defect has been found when the checking module 720 checks the working status of the UAV 110.

Further, since the rotors of the UAV 110 may collide with other objects during its flight, so that other modules may be incorporated to prevent further personal injury or damages from such collision. In some embodiments, the take-off control device 201 also includes a monitoring module 750 for monitoring at least one parameter of the UAV 110, for example, a rotation speed of the rotor.

In the presence of abnormality of the at least one parameter, a protection mechanism needs to set up. For example, a terminating module 760 is incorporated into the take-off control device 201 and configured to terminate the rotation of the rotor when the monitoring module 750 monitors an abnormality, for example, the rotation speed of the rotor abruptly changes.

In addition, during take-off, the UAV 110 may be thrown away due to the user's false operation. In such case, a tilting angle of the UAV 110 may be greater or the UAV 110 may flip over, and the altitude of the UAV 110 is difficult to control. Accordingly, the aforementioned at least one parameter may include an altitude of the UAV 110, and the monitoring module 750 is configured to monitor the attitude of the UAV 110 to obtain a tilting angle. In the occurrence of abnormality of the tilting angle, for example, the monitored tilting angle is greater than an angle threshold, the terminating module 760 is also configured to terminate the rotation of the rotor.

The above modules of device 201 as shown in FIG. 7 can be either functional blocks or actual components implemented by software, hardware or the combination. In real implementation, these modules or components might be integrated or combined as desired.

Moreover, an apparatus for controlling a UAV is provided in embodiments of the present disclosure. The apparatus includes a processor and a memory unit configured to store a take-off control program, wherein the process is configured to execute the take-off control program. The take-off control program includes the steps of: receiving a take-off preparatory signal instructing the UAV to enter into a take-off preparatory state; controlling the at least one rotor of the UAV to rotate at a preset rotation speed in response to the take-off preparatory signal, wherein the preset rotation speed is smaller than a rotation speed that enables the UAV to hover in the air; and controlling the UAV to enter into a hovering mode under a predetermined condition, wherein the UAV is controlled to hover at a predetermined height in the hovering mode.

More details about the take-off control program may refer to the description of the above method, and are not described in detail herein.

The apparatus and methods disclosed in the embodiments of the present disclosure can be implemented by other ways. The aforementioned apparatus embodiments are merely illustrative. For example, flow charts and block diagrams in the figures show the architecture and the function operation according to a plurality of apparatus, methods and computer program products disclosed in embodiments of the present disclosure. In this regard, each frame of the flow charts or the block diagrams may represent a module, a program segment, or portion of the program code. The module, the program segment, or the portion of the program code includes one or more executable instructions for implementing predetermined logical function. It should also be noted that in some alternative embodiments, the function described in the block can also occur in a different order as described from the figures. For example, two consecutive blocks may actually be executed substantially concurrently. Sometimes they may also be performed in reverse order, depending on the functionality. It should also be noted that, each block of the block diagrams and/or flow chart block and block combinations of the block diagrams and/or flow chart can be implemented by a dedicated hardware-based systems execute the predetermined function or operation or by a combination of a dedicated hardware and computer instructions.

Further, the functional modules disclosed in embodiments of the present disclosure may be integrated together to form a separate part. Alternatively, each module can be alone, or two or more modules can be integrated to form a separate section.

If the functions are implemented in the form of software modules and sold or used as a standalone product, the functions can be stored in a computer readable storage medium. Based on this understanding, the technical nature of the present disclosure, part contributing to the prior art, or part of the technical solutions may be embodied in the form of a software product. The computer software product is stored in a storage medium, including several instructions to instruct a computer device (may be a personal computer, server, or network equipment) to perform all or part of the steps of various embodiments of the present. The aforementioned storage media include: U disk, removable hard disk, read only memory (ROM), a random access memory (RAM), floppy disk or CD-ROM, which can store a variety of program codes. It should be noted that relational terms, such as first and second, are used solely to a separate operating entity from another entity, and do not necessarily require or imply that the actual such relationship or order exist between these entities or operations. Moreover, the term "comprising", "including" or any other variation thereof are intended to cover a non-exclusive inclusion, such that processes, methods, articles, or apparatus including a series of factors includes not only those elements, but also includes other elements not explicitly listed, or further includes inherent factors for such processes, methods, articles or devices. Without more constraints, elements defined by the statement "includes a . . . " does not exclude the presence of other elements included in the processes, methods, articles or devices.

Various embodiments have been described herein with reference to the accompanying drawings. It will, however, be evident that various modifications and changes may be made thereto, and additional embodiments may be implemented, without departing from the broader scope of the invention as set forth in the claims that follow.

Further, other embodiments will be apparent to those skilled in the art from consideration of the specification and practice of one or more embodiments of the invention disclosed herein. It is intended, therefore, that this disclosure and the examples herein be considered as exemplary only, with a true scope and spirit of the invention being indicated by the following listing of exemplary claims.

What is claimed is:

1. A method for controlling an unmanned aerial vehicle (UAV), the UAV comprising at least one rotor, the method comprising steps of:
   receiving a take-off preparatory signal instructing the UAV to enter into a take-off preparatory state;
   controlling the at least one rotor of the UAV to rotate at a preset rotation speed in response to the take-off preparatory signal, wherein the preset rotation speed is smaller than a rotation speed that enables the UAV to hover in the air; and
   controlling the UAV to enter into a hovering mode under a predetermined condition, wherein the UAV is controlled to hover at a predetermined height in the hovering mode.

2. The method of claim 1, wherein controlling the UAV to enter into the hovering mode further comprises steps of:
   increasing the preset rotation speed of the at least one rotor to a rated rotation speed;
   adjusting the rotation speed of the at least one rotor to change a motion speed of the UAV after the preset rotation speed of the at least one rotor is increased to the rated rotation speed;
   comparing the motion speed of the UAV with a first threshold motion speed; and
   if the comparison result indicates that the motion speed of the UAV is smaller than the first threshold motion speed, the height at which the UAV is positioned when the motion speed of the UAV is detected smaller than the first threshold motion speed will be the predetermined height at which the UAV hovers.

3. The method of claim 1, wherein controlling the UAV to enter into the hovering mode further comprises steps of:
   increasing the preset rotation speed of the at least one rotor to a rated rotation speed;
   adjusting the rotation speed of the at least one rotor to change a motion speed of the UAV after the preset rotation speed of the at least one rotor is increased to the rated rotation speed;
   comparing the motion speed of the UAV with a first threshold motion speed; and
   if the comparison result indicates that the motion speed of the UAV is greater than or equal to the first threshold motion speed after a first preset delay time expires, the height at which the UAV is positioned when the first preset delay time has expired will be the predetermined height at which the UAV hovers.

4. The method of claim 1, wherein controlling the UAV to enter into the hovering mode further comprises steps of:
   increasing the preset rotation speed of the at least one rotor to a rated rotation speed;
   adjusting the rotation speed of the at least one rotor to change a motion speed of the UAV after the preset rotation speed of the at least one rotor is increased to the rated rotation speed;
   wherein the step of adjusting further comprises:
      adjusting the rotation speed of the at least one rotor at a first rate within a first preset delay time;
      comparing the motion speed of the UAV with a first threshold motion speed; and
      adjusting the rotation speed of the at least one rotor at a second rate if the comparison result indicates that the motion speed of the UAV is greater than or equal to the first threshold motion speed after the first preset delay time has expired, wherein the second rate is greater than the first rate.

5. The method of claim 1, wherein after the step of controlling the at least one rotor of the UAV to rotate at the preset rotation speed, the method further comprises steps of:
   detecting a motion speed of the UAV; and
   controlling the UAV to enter into a hovering mode when the motion speed of the UAV is under the predetermined condition.

6. The method of claim 5, wherein the predetermined condition is that the motion speed of the UAV is greater than or equal to a second threshold motion speed.

7. The method of claim 5, wherein the predetermined condition is that the motion speed of the UAV is smaller than a second threshold motion speed after a second preset delay time expires.

8. The method of claim 1, wherein the take-off preparatory signal is generated in response to a take-off preparatory instruction input by a user.

9. The method of claim 1, wherein before the step of controlling the at least one rotor of the UAV to rotate at a preset rotation speed, the method further comprises steps of:

counting a preset preparatory time upon receiving the take-off preparatory signal; and sending a reminder to a user when the preset preparatory time has expired.

10. The method of claim 1, wherein before the step of controlling the at least one rotor of the UAV to rotate at a preset rotation speed, the method further comprises a step of:

checking a working status of the UAV; and wherein the step of controlling the at least one rotor of the UAV to rotate at a preset rotation speed is performed when no failure or defect has been found during the step of checking.

11. The method of claim 1, further comprising steps of:

monitoring at least one status parameter of the UAV; and terminating the rotation of the at least one rotor in response to monitoring abnormality of the at least one status parameter of the UAV.

12. The method of claim 11, wherein the at least one status parameter comprises the rotation speed of the at least one rotor, and/or a tilting angle of the UAV; and wherein the step of terminating further comprises:

terminating the rotation of the at least one rotor in response to that the rotation speed of the at least one rotor changes abnormally, and/or that the tilting angle of the UAV is greater than a threshold angle.

13. An apparatus for controlling an unmanned aerial vehicle (UAV), the UAV comprising at least one rotor, the apparatus comprising:

a processor; and a memory unit configured to store a take-off control program, wherein the processor is configured to execute the take-off control program, and the take-off control program comprises steps of:

receiving a take-off preparatory signal instructing the UAV to enter into a take-off preparatory state;

controlling the at least one rotor of the UAV to rotate at a preset rotation speed in response to the take-off preparatory signal, wherein the preset rotation speed is smaller than a rotation speed that enables the UAV to hover in the air; and controlling the UAV to enter into a hovering mode under a predetermined condition, wherein the UAV is controlled to hover at a predetermined height in the hovering mode.

14. The apparatus of claim 13, wherein controlling the UAV to enter into the hovering mode further comprises steps of:

increasing the preset rotation speed of the at least one rotor to a rated rotation speed;

adjusting the rotation speed of the at least one rotor to change a motion speed of the UAV after the preset rotation speed of the at least one rotor is increased to the rated rotation speed;

comparing the motion speed of the UAV with a first threshold motion speed, and if the comparison result indicates that the motion speed of the UAV is smaller than the first threshold motion speed, the predetermined height at which the controller controls the UAV to hover is the height at which the UAV is positioned when the motion speed of the UAV is detected smaller than the first threshold motion speed.

15. The apparatus of claim 13, wherein controlling the UAV to enter into the hovering mode further comprises steps of:

increasing the preset rotation speed of the at least one rotor to a rated rotation speed;

adjusting the rotation speed of the at least one rotor to change a motion speed of the UAV after the preset rotation speed of the at least one rotor is increased to the rated rotation speed;

comparing the motion speed of the UAV with a first threshold motion speed, and if the comparison result indicates that the motion speed of the UAV is greater than or equal to the first threshold motion speed after a first preset delay time expires, the predetermined height at which the controller controls the UAV to hover is the height at which the UAV is positioned when the first preset delay time has expired.

16. The apparatus of claim 13, wherein controlling the UAV to enter into the hovering mode further comprises steps of:

increasing the preset rotation speed of the at least one rotor to a rated rotation speed;

adjusting the rotation speed of the at least one rotor to change a motion speed of the UAV after the preset rotation speed of the at least one rotor is increased to the rated rotation speed;

wherein the step of adjusting further comprises:

adjusting the rotation speed of the at least one rotor at a first rate within a first preset delay time;

comparing the motion speed of the UAV with a first threshold motion speed; and adjusting the rotation speed of the at least one rotor at a second rate if the comparison result indicates that the motion speed of the UAV is greater than or equal to the first threshold motion speed after the first preset delay time has expired, wherein the second rate is greater than the first rate.

17. The apparatus of claim 13, wherein after the step of controlling the at least one rotor of the UAV to rotate at the preset rotation speed, the take-off control program further comprises steps of:

detecting a motion speed of the UAV; and controlling the UAV to enter into a hovering mode when the motion speed of the UAV is under the predetermined condition.

18. The apparatus of claim 17, wherein the predetermined condition is that the motion speed of the UAV is greater than or equal to a second threshold motion speed.

19. The apparatus of claim 17, wherein the predetermined condition is that the motion speed of the UAV is smaller than a second threshold motion speed after a second preset delay time expires.

20. The apparatus of claim 13, wherein the take-off preparatory signal is generated in response to a take-off preparatory instruction input by a user.

21. The apparatus of claim 13, wherein before the step of controlling the at least one rotor of the UAV to rotate at a preset rotation speed, the take-off control program further comprises steps of:

counting a preset preparatory time upon receiving the take-off preparatory signal; and sending a reminder to a user when the preset preparatory time has expired.

22. The apparatus of claim 13, wherein before the step of controlling the at least one rotor of the UAV to rotate at a preset rotation speed, the take-off control program further comprises a step of:

checking a working status of the UAV; and wherein the step of controlling the at least one rotor of the UAV to rotate at a preset rotation speed when no failure or defect has been found during the step of checking.

23. The apparatus of claim 13, wherein the take-off control program further comprises steps of:

monitoring at least one status parameter of the UAV; and terminating the rotation of the at least one rotor in response to monitoring abnormality of the at least one status parameter of the UAV.

24. The apparatus of claim 23, wherein the at least one status parameter comprises the rotation speed of the at least one rotor, and/or a tilting angle of the UAV; and wherein the step of terminating further comprises:

terminating the rotation of the at least one rotor in response to that the rotation speed of the at least one rotor changes abnormally, and/or that the titling angle of the UAV is greater than a threshold angle.

\* \* \* \* \*